(12) United States Patent
Paulus

(10) Patent No.: US 11,639,994 B1
(45) Date of Patent: May 2, 2023

(54) METHODS FOR LOCATING UNDERWATER OBJECTS BY SENSING PRESSURE WAVES

(71) Applicant: The United States of America as represented by the Secretary of the Navy, Arlington, VA (US)

(72) Inventor: Mark Paulus, Poulsbo, WA (US)

(73) Assignee: The United States of America as represented by the Secretary of the Navy, Keyport, WA (US)

( * ) Notice: Subject to any disclaimer, the term of this patent is extended or adjusted under 35 U.S.C. 154(b) by 360 days.

(21) Appl. No.: 16/873,829

(22) Filed: Jul. 17, 2020

Related U.S. Application Data

(60) Provisional application No. 62/921,999, filed on Jul. 19, 2019.

(51) Int. Cl.
*G01S 5/18* (2006.01)
*G01S 15/58* (2006.01)
*G01V 1/18* (2006.01)

(52) U.S. Cl.
CPC ............ *G01S 15/588* (2013.01); *G01S 5/18* (2013.01); *G01V 1/186* (2013.01); *G01V 2210/1427* (2013.01)

(58) Field of Classification Search
CPC ......... G01S 15/588; G01S 5/18; G01V 1/186; G01V 2210/1427
See application file for complete search history.

(56) References Cited

U.S. PATENT DOCUMENTS

| 5,224,170 | A  | * | 6/1993 | Waite, Jr. | ............. | H04R 29/006 |
| | | | | | | 708/322 |
| 8,428,897 | B2 | * | 4/2013 | Richmond | ................ | G01S 3/74 |
| | | | | | | 704/E19.01 |
| 2009/0213695 | A1 | * | 8/2009 | Arvelo, Jr | ............. | G01S 3/8006 |
| | | | | | | 367/99 |
| 2010/0106440 | A1 | * | 4/2010 | Richmond | ................ | G01S 3/74 |
| | | | | | | 702/71 |
| 2013/0133832 | A1 | * | 5/2013 | Kuboi | ................ | H01L 21/3065 |
| | | | | | | 703/2 |

\* cited by examiner

*Primary Examiner* — Daniel L Murphy
*Assistant Examiner* — Amie M Ndure
(74) *Attorney, Agent, or Firm* — Stephen J. Leahu; Naval Undersea Warfare Center

(57) ABSTRACT

An acoustic vector sensor has an array of sensors to detect at least the bearing of a target. The acoustic vector sensor or hydrophone with sensor array avoids the need to deploy multiple hydrophones each with a single sensor. The array of sensor signals can be processed using any one of a number of methods.

9 Claims, 8 Drawing Sheets

METHODS FOR LOCATING UNDERWATER OBJECTS BY SENSING PRESSURE WAVES

CROSS REFERENCE TO OTHER PATENT APPLICATIONS

The present application claims the benefit of U.S. Provisional Patent Application Ser. No. 62/921,999 filed 19 Jul. 2019 and titled: Acoustic Vector Sensor, the complete disclosure of which is incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention pertains generally to acoustic vector sensors including hydrophones and their use. A hydrophone is an underwater sensor. Just as a microphone is used to detect sound in the air, a hydrophone detects sounds, noise, or pressure waves in the water. Prior art hydrophones work by sensing the change in pressure that results as a sound wave travels through water, and converting that measurement to a corresponding electrical signal. The hydrophone converts this acoustic energy—the change in pressure—to an electrical signal.

In one common application, scientists place hydrophones in the water to detect the location of underwater objects and particles. As shown in FIG. 1, a single hydrophone 1 senses the sound, or pressure wave 2, made by the boat 6 as it travels through the water. The magnitude and the direction of the wave 2 may be used to obtain the angle, or relative bearing θ, and approximate distance, R, to the tracked vessel 6. The configuration shown in FIG. 1 can be useful for detecting the presence of a vessel 6 but range, R, and bearing θ, information from a single sensor can be prone to very large errors.

An alternative method for employing hydrophones to detect and track a vessel, utilizes two hydrophones as shown in FIG. 2. In the arrangement of FIG. 2, a first hydrophone 8 detects a pressure wave 2 from a passing vessel 6 at time t. A second hydrophone 10, placed in a location other than that occupied by hydrophone 8, can be used to improve the accuracy of the hydrophone measurements. In the arrangement of FIG. 2, the range and bearing information obtained by hydrophones 8 and 10 provide a means of better triangulating a fix on the position of tracked vessel 6. By noting the difference in the time at which pressure signal 2 reaches hydrophone 8 and hydrophone 10, an additional means of determining the distance to vessel 6 can be computed. In addition, the rate of change in the bearings $\theta_1$ and $\theta_2$; and/or range R1 and R2, also provide information useful for computing the course and speed of vessel 6. A Detailed discussion of bearing and range calculations from hydrophone data is described in: Liu et al., "Joint Bearing and Range Estimation of Multiple Objects from Time-Frequency Analysis," Sensors, vol. 18, no: 1, 291 (19 Jan. 2018), https://doi.org/10.3390/s18010291, the entire contents of which are incorporated herein by reference.

The simple diagram of FIG. 2 illustrates certain benefits of using multiple hydrophones to detect and track vessel 6. To detect and track vessel 6 over larger distances or with greater precision, larger and larger arrays of prior art hydrophones are necessary. For a variety of reasons, however, placing large arrays of hydrophones in the water can be prohibitive.

First, placing such sensitive equipment in water requires exotic protective coatings and complex mechanical housings to properly seal and safeguard the hydrophone's sensors and electronics. This fact makes hydrophones an expensive apparatus. This fact can additionally make industrial grade hydrophones very heavy and cumbersome.

Second, deploying multiple hydrophones in the water is an exercise that exposes boats and crewmen to extended operations on the water. Underway operations incur significant expenses in fuel and operating costs. Underway operations are also not without risks to personnel and equipment. These adverse considerations only multiply when the hydrophone is deployed from aircraft in lieu of a vessel. The time needed to deploy large arrays of hydrophones grows, as does the cost and risk, with each additional hydrophone added to the array.

Third, geometry and precision may hinder the utility of the hydrophone array. The placement and location of each hydrophone must be accurately known and determined. Errors in the exact location of each hydrophone and their relative placement to each other results in corresponding errors in computing the location, bearing, track and speed of a sensed vessel or event. The topography of the seabed, local sea life, and other physical constraints may also limit the size of the hydrophone array. In some cases, these constraints become so severe, that an array cannot be deployed at all, or is of limited accuracy or use.

SUMMARY OF THE INVENTION

The present invention includes recognition of the problems and challenges of the prior art. According to one aspect of the present invention, a single vector sensor or hydrophone includes at least two individual sensors located in at least two different positions within a single hydrophone.

According to another aspect of the present invention, multiple individual sensors within the vector sensor or hydrophone are arranged in an orthogonal grid.

According to another aspect of the present invention, a single vector sensor or hydrophone includes an array of individual sensors, each having a different orientation from a first sensor, or from each other.

The vector sensor or hydrophone constructed according to the present invention includes several sensing elements, situated such that each senses a slightly different time of receipt of signal (phase), or bearing to the same target. This feature suppresses incoherent noise in the measurements and improves accuracy, The improved vector sensor of the present invention therefore determines measurements, such as for example, bearing to the originating source with greater accuracy than can be had with existing single sensors or with arrays of sensors. The improved vector sensor of the present invention reduces costs and improves operational efficiency by providing the accuracy normally only achieved via an array, or via a larger array, of prior art hydrophones.

The improved vector sensor or hydrophone of the present invention additionally enables acoustic sensing to be utilized in physically confining locations not previously amenable to such activities. For example, the improved hydrophone of the present invention can be effectively deployed in arrays much more compact than prior art arrays having similar performance. The hydrophone array formed by utilizing hydrophones of the present invention achieves the accuracy and coverage of larger, prior art arrays, but with a much smaller area footprint. Thus, the present invention enables hydrophonic sensing to be used even in locations where underwater physical topology or environmental impact concerns might otherwise constrain its use; or prevent utilization of multiple hydrophone arrays.

By enabling more compact arrays utilizing hydrophones of the present invention, without a reduction of accuracy, deployment of arrays takes less time than required for the larger arrays of the prior art. Fewer hydrophones within an array for the same accuracy and coverage as prior art arrays additionally means that operational crews, aircraft, and boats must haul and manhandle less weight when configuring a sensing array. In addition, the hydrophone of the present invention employs devices and a configuration that results in less weight per hydrophone than those currently manufactured according to the prior art. The reductions in weight afforded by the present invention mean a corresponding increase in the weight of fuel or other gear that can be carried aboard the deploying craft. The reductions in weight afforded by the present invention also mean a corresponding reduction in the risk of accident or injury to personnel.

These and additional advantages and features of the present invention shall be apparent from the detailed description and the Figures.

DESCRIPTION OF EXEMPLARY
EMBODIMENTS OF THE INVENTION

The detection and measurement of soundwaves in the water or other fluids has numerous applications. Naval forces deploy hydrophones from boats and aircraft to listen for surface vessels, and submarines and to conduct antisubmarine warfare. Geologists and oceanographers utilize hydrophones to detect underwater volcanoes and conduct seismological ocean surveys. Marine biologists and recreational hobbyists use hydrophones to detect and monitor the movements of whales and other sea life. Test engineers use hydrophones to track the location and monitor the performance of underwater autonomous vehicles, surface vessels, and other test items. As will be apparent to those of ordinary skill in the art, the present invention may be utilized with these and in many other hydrophone and vector sensing applications.

1.0 General Overview of the Invention

Figure 2:
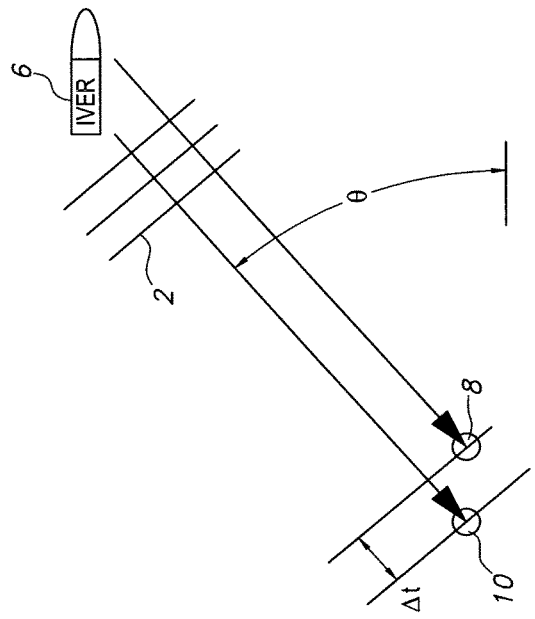
FIG. 2 is a diagram of an alternative hydrophone deployment as known in the prior art.
Figure 1:
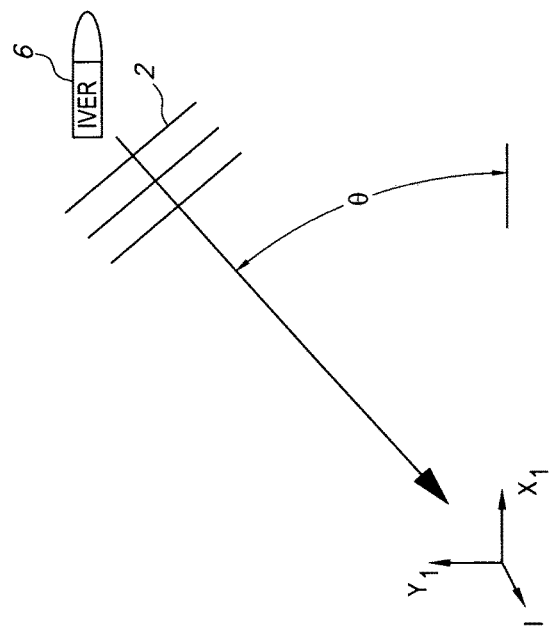
FIG. 1 is a diagram of hydrophone operation as known in the prior art.
Figures 3A, 3B:
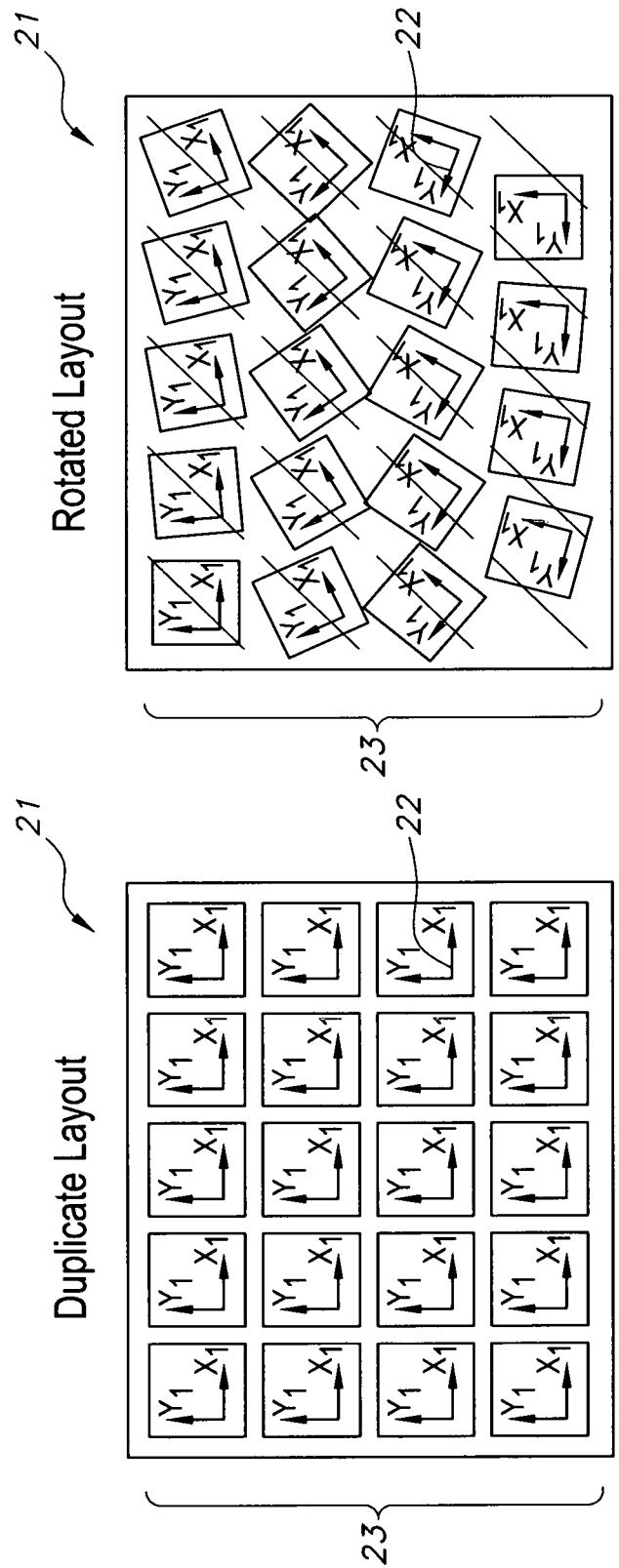
FIGS. 3A and 3B are diagrams of vector sensors according to embodiments of the invention.

In the embodiment of the invention depicted in FIG. 3A and FIG. 3B, an acoustic vector sensor or hydrophone includes an array 21 of sensors 22 arranged in an orthogonal grid. Elements 23 of arrays 21 include the individual sensors 22. In the embodiment of FIG. 3A, the sensing axes of sensors 22 are substantially parallel to the sensing axes of sensors 22 of the adjacent rows and columns of array 21.

In the embodiment of FIG. 3B, sensors 22, are also arranged in a grid pattern as shown. Unlike the embodiment of FIG. 3A, however, the X-Y sensing axes of each sensor are not oriented parallel to each other. In the embodiment of FIG. 3B, the X-Y sensing axes are obliquely offset from the X-Y sensing axes of the adjacent sensor. In a further possible embodiment, the sensing coordinate system of each element 23 and its associated sensors 22 progress at a predetermined angular increment with each successive element of 23 of array 21. The alternative configuration of FIG. 3B creates diversity in the received signals thus reducing bias in the aggregate increasing the accuracy of the bearing.

In one exemplary embodiment of the invention, sensors 22 comprise MEMS (micro-electrical mechanical system) accelerometers such as, for example, Model JTF general purpose accelerometers described at https://measurement-sensors.honeywell.com/ProductDocuments/Accelerometer/Model_JTF_Datasheet.pdf, manufactured by Honeywell, the complete contents of which are incorporated herein by reference. Other accelerometer devices known to those of ordinary skill in the art may also be used.

Sensors 22 are mounted on a circuit board. In one embodiment of the invention, as seen in FIG. 3A, at each location 23, there is at least a first accelerometer oriented to detect acceleration on the X axis and a second accelerometer oriented to detect acceleration on the Y axis. According to the embodiment of the invention shown in FIG. 3A, sensors 22 comprise an array of 40 sensors (20 pairs of accelerometers) arranged in a 4×5 matrix. In the embodiment of FIG. 3B, sensors 22 comprise an array of 19 accelerometer pairs. Other combinations and configurations of sensors 22 are possible.

In real world applications, the precise orientation of the pressure wave to the sensor is often not planar and the wave can therefore additionally include a vertical component. For this reason, array elements 23 may also optionally include three accelerometers located in a triad configuration to sense acceleration on the X, Y, and Z axes. According to this alternative embodiment of the invention, the array 21 of sensors 22 shown in FIG. 3A, comprises 60 accelerometers also arranged in a 4×5 matrix with each location 23 having a triad of three accelerometers.

In yet another alternative embodiment, sensors 22 may comprise one or more accelerometers paired with an omnidirectional pressure sensor, such as for example but not limited to, a microphone; or a single pressure sensor. A sound intensity probe kit 3599 and sound sensing microphone 4197 manufactured by Bruel & Kjaer, www.bksv.com are one example of one such pressure sensor and microphone. A paper by F. Jacobsen and H.-E. de Bree, "A comparison of two different sound intensity measurement principles," *Journal of the Acoustical Society of America*, vol. 118, no. 3, pp. 1510-1517, 2005, incorporated herein by reference, discusses use of pressure-pressure sensors and pressure-velocity sensors. Honeywell Corporation manufactures a variety of pressure and flow sensors as described at: https://sensing.honeywell.com/sensing-pressure-force-flow-rg-008081.pdf and incorporated herein by reference. Other microphones or pressure sensors from a variety of manufacturers and known to those of ordinary skill in the art may also be used and the invention is not limited to the particular models or types listed above.

Figure 4:
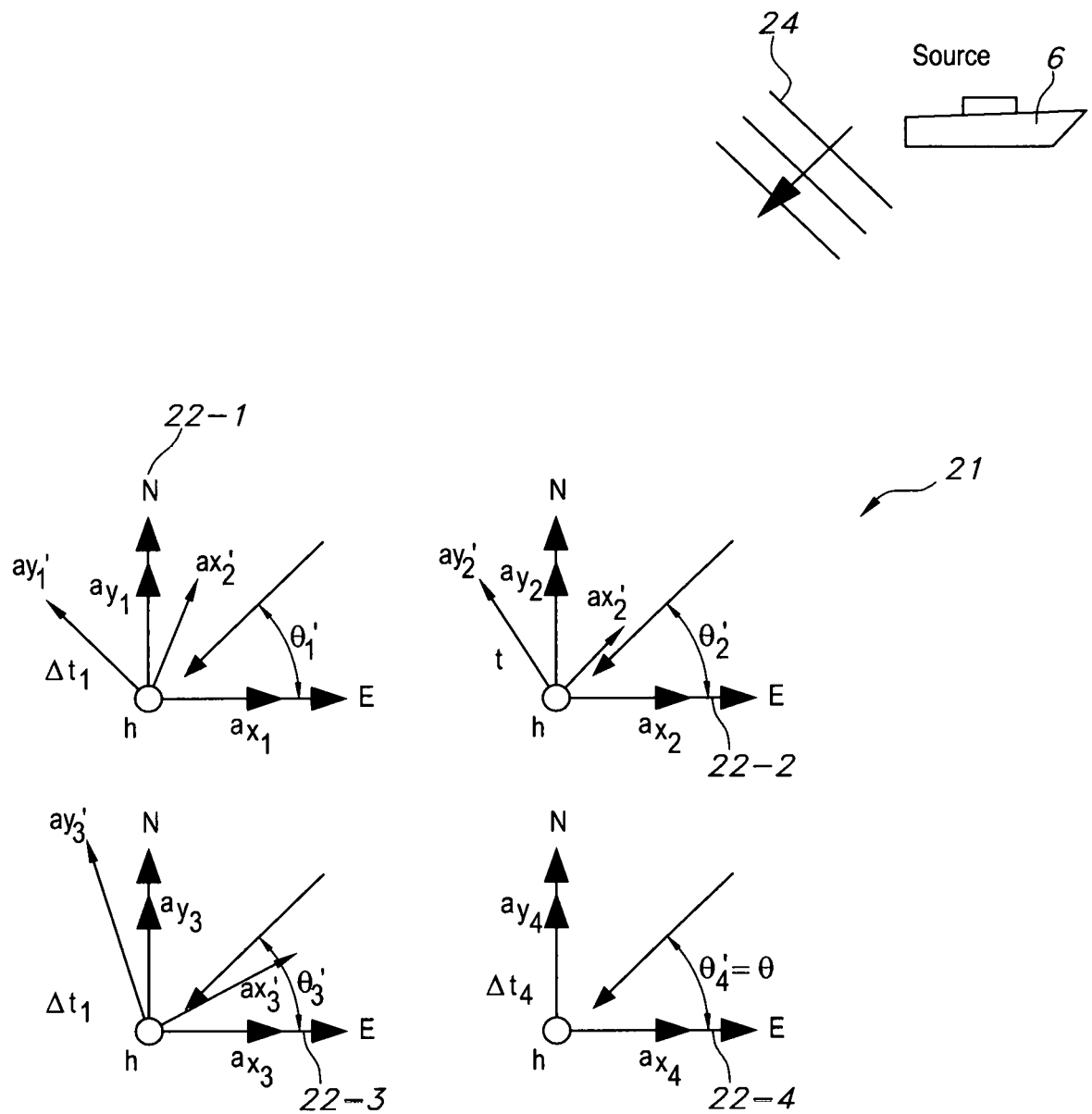
FIG. 4 illustrates operation of embodiments of the invention.

FIG. 4 illustrates operation of embodiments of the present invention. When a sound or pressure wave, 24 is received at hydrophone or vector sensor 40, each of sensors 22 detects an acceleration along its Y and X axes according to the magnitude and direction of the particle velocity 24. As seen in FIG. 4, wave 24 impacts each of sensors 22 generating independent measurements of the particle velocity in each axis.

2.0 Signal Processing

There thus exist a variety of computational methods to resolve the sensed vector motion. Solely for purposes of describing these computational methods, sensors 22 comprise a pair of accelerometers located at location 23 as well as a pressure sensor. One accelerometer is oriented in the X reference frame and the remaining accelerometer is oriented to sense in the Y reference frame. In this configuration, the measured values of pressure, h, and acceleration, h(t), x(t), and y(t) can be represented by the finite Fourier transform as:

$$a_{x,k}(f,T) = \int_0^T a_{x,k}(t) e^{-i\omega t} dt \quad 0\text{-}1$$

$$a_{y,k}(f,T) = \int_0^T a_{y,k}(t) e^{-i\omega t} dt \quad 0\text{-}2$$

$$H_k(f,T) = \int_0^T h_k(t) e^{-i\omega t} dt \quad 0\text{-}3$$

Where p is the pth record of length T, ω is the frequency in radians.

2.1 Power Spectrum Method

Figure 5:
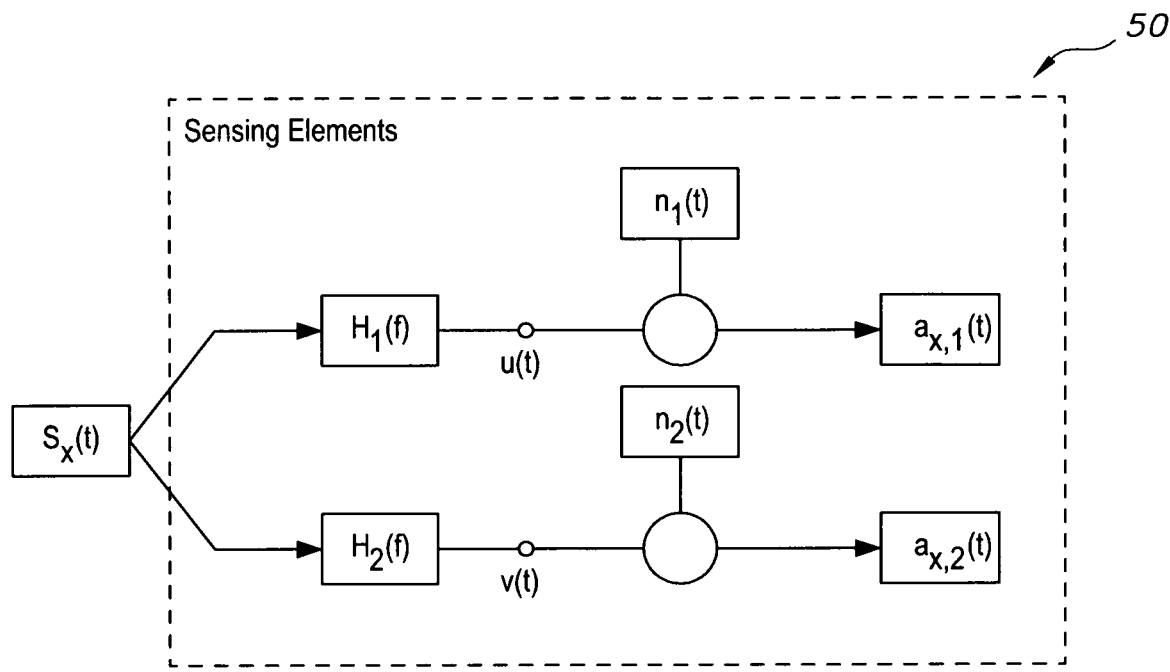
FIG. 5 is a system representation according to an embodiment of the invention.

The array of sensors 22 can be considered a single-input/multi-output (SIMO) system. The resulting system 50 can be drawn as shown in FIG. 5. In the drawing of FIG. 5, S(t) is the true acceleration in the x direction due to an acoustic pressure wave. With negligible ambient acoustic noise, the true measurement will pass through a transfer function H(f), and provide a measurement of u(t) or v(t). The transfer function for each sensor accounts for the sensor orientation and cross axis sensitivity and is discussed in greater detail below.

In actual practice, all measurements contain some noise. Noise can result from the ambient environment, or from the construction and operation of the sensor itself. In the systems diagram of FIG. 5, the measurement noise is represented by $n_1(t)$ and $n_2(t)$ and provides a noisy measurement of the true acceleration. The resulting, noisy, measurement of the sensed acceleration is $A_{x,1}(t)$ and $A_{x,2}(t)$. The auto spectrum can be determined as:

$$G_{a_{x,1}a_{x,1}} = H_1 \cdot G_{S_x S_x} + G_{n_1 n_1} \quad 0\text{-}4$$

$$G_{a_{x,2}a_{x,2}} = H_2 \cdot G_{S_x S_x} + G_{n_1 n_1} \quad 0\text{-}5$$

Where G represents the one sided auto spectrum. The cross spectrum can be determined as:

$$G_{a_{x,2}a_{x,1}} = H_2^* H_1 G_{S_x S_x} \quad 0\text{-}6$$

Where <*> is the conjugate transpose. In the case where $H_2=H_1=1$, the above equation reduces to:

$$G_{a_{x,2}a_{x,1}} = G_{S_x S_x} \quad 0\text{-}7$$

Which demonstrates that the true measurement of the source of power in the x direction can be computed directly from the cross spectrum of multiple sensing elements that are oriented in that same direction. A similar derivation results for sensor elements on the Y axis.

The transfer function H(f) of FIG. 5 can safely be assumed to equal 1, if the axis of the sensor measurement and the source of the acoustic pressure measurement are aligned and there is no cross axis sensitivity. For cases where this assumption does not hold, the transfer function would need to be determined. Estimating the transfer function can be done empirically, but in most practical cases, this determination can be performed by awareness of the geometry of the sensing element locations and sensor calibration.

The direction of arrival, angle θ, can then be computed by the magnitude of the motion in the X and Y direction as follows and wherein the values are usually averaged over multiple time windows:

$$\theta = \arctan\left(\sqrt{\frac{G_{S_y S_y}}{G_{S_x S_x}}}\right) \quad 0\text{-}8$$

2.2 Intensity Method

Intensity based methods are well known direction finding methods that can be performed in both the time and frequency domains. The time domain active acoustic intensity is defined by the following equation:

$$\phi = \arctan\left(\frac{E\{I_y\}}{E\{I_x\}}\right) \quad 0\text{-}11$$

Where $\langle \ \rangle_T$ is the time average, p is the instantaneous pressure, u is the instantaneous velocity and * is the complex conjugate. Alternatively, the acoustic intensity can be defined in the frequency domain as:

$$I(\omega) = p(\omega)u(\omega) = \text{Re}\{p(\omega)u(\omega)^*\} \quad 0\text{-}10$$

where ω is the frequency in radians/s. The intensity is calculated in each Cartesian direction and represented as $I_x$, $I_y$, and $I_z$.

The direction of arrival (DOA) of the target can then be found by:

$$I(t) = \langle p(t)u(t) \rangle_T = \left\{\frac{1}{2}\text{Re}\{p(t)u(t)^*\}\right\}_T \quad 0\text{-}9$$

Where E{•} is the expected value, and φ is the bearing angle to the target.

The velocity can be defined by the measured acceleration. The acceleration measurement occurs at a point: the location of the accelerometer/sensor. If sensors 22 comprise accelerometers in an X, Y orientation and we assume the acoustic wave is a planar pressure wave, the pressure in each Cartesian direction can be defined as:

$$a_x = -A_x i e^{kx + i\omega t} \quad 0\text{-}12$$

Integrating with respect to time and evaluating at x=0, $$u_x(t) = -\frac{A_x}{\omega} e^{i\omega t} \quad 0\text{-}13$$

Rearranging the above equation yields:

$$u_x(t) = \frac{1}{\omega i} a_x \quad \quad 0\text{-}14$$

Solving for velocity in the frequency domain, can be determined using the Fourier transform F, as:

$$u_x(\omega) = \mathcal{F}(u_x(t)) = \frac{1}{\omega i} \mathcal{F}(a_x(t)) \quad \quad 0\text{-}15$$

Combining Equations 0-10 and 0-15, the intensity can be rewritten as:

$$I_x(\omega) = \text{Re}\left\{ p(\omega) \left[ \frac{1}{\omega i} \mathcal{F}(a_x(t)) \right]^* \right\} \quad \quad 0\text{-}16$$

The method can be implemented by using the expected value of intensity measurements during subsequent window. Within each window, the intensity is measured for each frequency. According to an embodiment of the invention, the intensity is defined as:

$$\hat{I}_x(\omega) = \sum_{n=1}^{N} \text{Re}\{p(\omega_n) u_x(\omega_n)^*\} \quad \quad 0\text{-}17$$

Where $\omega_n$ is the frequency of the DFT bins and N is the total number of bins considered in the analysis.

Using the intensity method in the frequency domain, the bearing angle can now be written as:

$$\hat{\phi} = \arctan\left( \frac{E\{\hat{I}_y(\omega)\}}{E\{\hat{I}_x(\omega)\}} \right) \quad \quad 0\text{-}18$$

When there are multiple sources or significant ambient noise, a weighted average or histogram approach can also be employed to evaluate the bearing angle. The textbook, *Fundamentals of Acoustics*, by Kinsler, Frey, Coppens and Sanders, published by John Wiley & Sons, 2000, contains details of this method and is incorporated herein by reference.

2.3 Minimum Intensity Method

When sensors 22 are rotated relative to each other as shown in FIG. 3B, an additional method, the minimum intensity method, may also be used. In one possible embodiment of the invention, sensors 22 are rotated at small angles relative to each other in defined increments, such as, for example, 5 degree increments. Intensity processing is then carried out on every element of the array in accordance with equation 3-17. In the DOA there will be a maximum intensity and in the direction±90 degrees from the direction of arrival there will be a minimum intensity. The minimum value or maximum value can be used either alone or in combination with this fact as an additional means to resolve the direction and bearing to target.

2.4 Conventional Beamformer (Bartlett) and Cardioid Method

Figure 6:
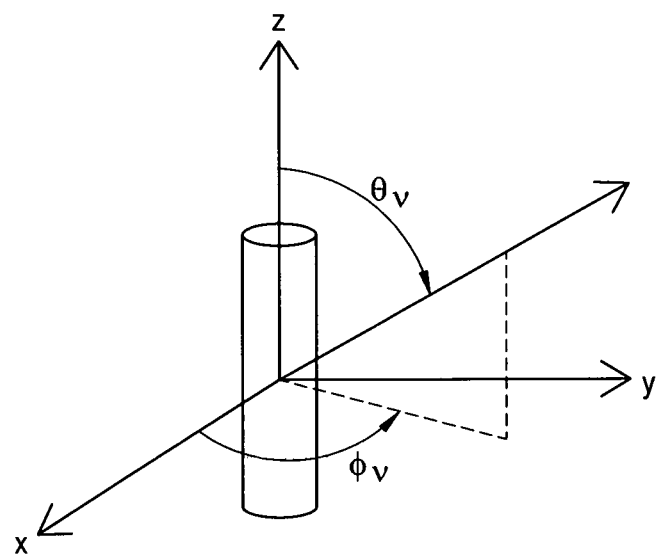
FIG. 6 illustrates steering angle definitions as used in a cardioid or Bartlett beamforming signal processing according to an embodiment of the invention.

Conventional beamforming is performed by using weighted vectors. The vectors are defined as:

$$w_x = \alpha_0 \sin \Theta_v \cos \phi_v \quad \quad 0\text{-}19$$

$$w_y = \alpha_1 \sin \Theta_v \sin \phi_v \quad \quad 0\text{-}20$$

$$w_z = \alpha_2 \cos \Theta_v \quad \quad 0\text{-}21$$

$$w_p = \alpha_3 \quad \quad 0\text{-}22$$

Where the steering angles $\Theta_v$ and $\phi_v$ are defined as shown in FIG. 6.

Figure 7:
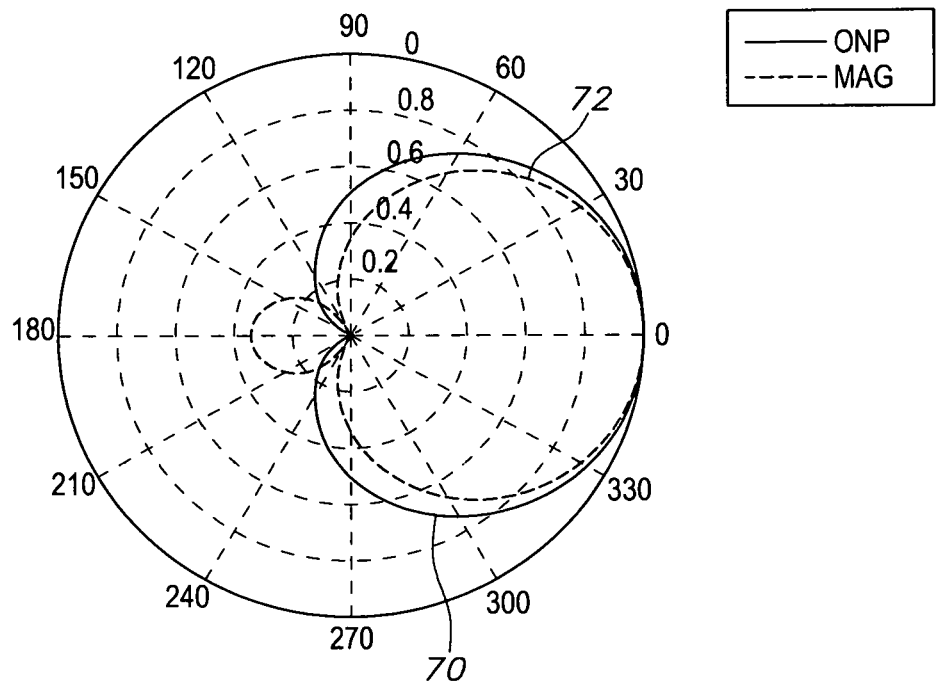
FIG. 7 illustrates cardioid beam patterns used in signal processing according to embodiments of the invention.

The beam weights, $\alpha_0$, $\alpha_1$, $\alpha_2$, $\alpha_3$, are defined based on the specific beam pattern desired. For Optimal Null Placement (ONP), $\alpha_0 = \alpha_1 = \alpha_2 = \alpha_3 = 1$, while for the Maximum Array Gain (MAG), $\alpha_0 = \alpha_1 = \alpha_2 = 2$, $\alpha_3 = 1$. The MAG beam pattern provides a narrower beam width, but at the expense of a tail in the opposite direction of the target. The normalized beam patterns 70 and 72 for both the ONP and MAG patterns respectively are as shown in FIG. 7. Both methods may be used in conjunction with the present invention, but for purposes of the following discussion, the ONP beam weights are used in the equations below.

The beam output value y is given as:

$$y(\omega, \Theta_v, \phi_v) = w^*(\Theta_v, \phi_v) X(\omega) \quad \quad 0\text{-}23$$

Where * is complex conjugate transpose (Hermitian Transpose), w is the weight vector. Equation 0-23 is often referred to as the Cardiod Beam Forming Equation. Suppressing the frequency and angular dependence for clarity, w is defined as:

$$w = \begin{bmatrix} w_x \\ w_y \\ w_z \\ w_p \end{bmatrix} \quad \quad 0\text{-}24$$

X is the measured and scaled data vector defined as:

$$X = \begin{bmatrix} \rho c u_x \\ \rho c u_y \\ \rho c u_z \\ p \end{bmatrix} \quad \quad 0\text{-}25$$

The data vector X velocity values are scaled by ρc such that the matrix summation is performed over consistent units. The scaling factor ρc can be determined by Euler's equation:

$$\rho \frac{du}{dt} = -\nabla p \quad \quad 0\text{-}26$$

where for a plane wave, the specific acoustic impedance is defined as:

$$z = \frac{p}{u} = \pm \rho c \quad \quad 0\text{-}27$$

And c is the speed of sound in the media.
The statistical power of the beamformer is given by:

$$E\{y(f)^2\} = w^* E\{XX^*\} w = w^* R w \quad \quad 0\text{-}28$$

where R is the sensors cross correlation matrix or alternately the Cross Spectral Density Matrix (CSDM). In practice, CSDM is averaged over multiple FFT windows M such that:

$$R \approx \sum_{i=1}^{M} X_i X_i^* \qquad 0\text{-}29$$

The target bearing $\phi$ and elevation angle $\Theta$ maximize the beamformer power $E\{y(f)^2\}$ when the target angles are 180 degrees out of phase with the steering vector.

2.5 Numerical Simulation

Figure 8:
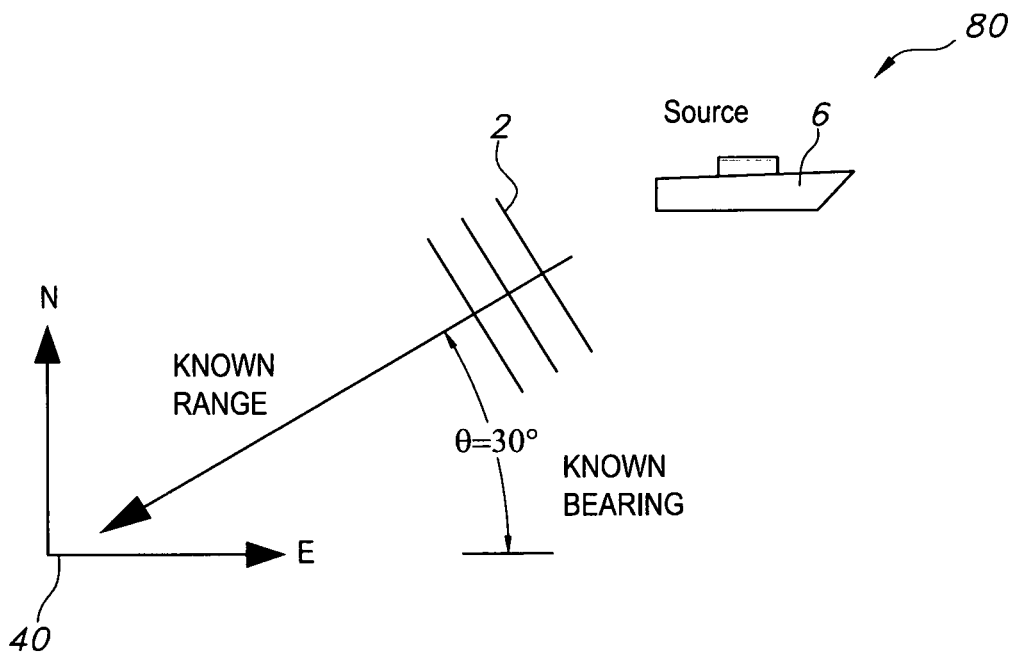
FIG. 8 is an example bearing angle simulation illustrating use of numerical simulation for comparison of subsequent measurements according to an embodiment of the invention.

A fifth method for resolving an array 21 of sensor 22 data into a single vector sensor uses a known source, or set of sources to calibrate the array. According to one embodiment of the invention, a known source oriented at a known bearing angle can be used. An example bearing angle simulation/calibration is shown in FIG. 8.

The resultant amplitude was normalized to 1 at a frequency of 1000 Hz, with N and E equivalent pressure amplitudes defined as:

$$N = \sin d(30) = 0.5 \qquad 0\text{-}30$$

$$E = \cos d(30) = \sqrt{3}/2 \qquad 0\text{-}31$$

The source levels can then be described as:

$$\text{north}(t) = N \sin(\omega t) \qquad 0\text{-}32$$

$$\text{east}(t) = E \sin(\omega t) \qquad 0\text{-}33$$

$$h(t) = \sin(\omega t) \qquad 0\text{-}34$$

Where $\omega$ [rad] is defined as:

$$\omega = 2\pi f \qquad 0\text{-}35$$

And f is 1000 Hz.

Next, the measurement noise is modeled including development of a signal to noise ratio (SNR). Many techniques known to those of ordinary skill in the art can be used for this purpose, but according to one embodiment of the invention, the noise was simulated using MATLAB's dsp.coloredNoise object. The SNR was determined by:

$$SNR = \frac{P_{signal}}{P_{Noise}} \qquad 0\text{-}36$$

Where $P_{signal}$ is the power of the signal and $P_{Noise}$ is the power of the noise.

For each noise model and each SNR a table of values for $a_x$, $a_y$, and h can be populated for the known source at the known bearing. According to one embodiment of the invention, the signal and noise levels are computed using power spectrum values. In this same embodiment, frequency bins from 995-1005 Hz were used to account for any spectral leakage.

As previously described in connection with FIGS. 3A and 3B sensors 22 may be arrayed such that their axes are parallel to each other. Optionally, array elements 23 may be arrayed such that the sensing axes of sensors 22 are rotated relative to the remaining array elements. In one embodiment, sensors 22 are rotated at set incremental intervals throughout the array. Thus, determining the measured acceleration and pressure values using the numerical simulation method employs different sets of equations depending upon the architecture of the array of sensors 22.

When the array comprises sensors 22 oriented parallel to each other, the acceleration signals vary only by the independent noise. The measurement of the kth sensing element can be described as:

$$a_{x,k}(t) = \text{east}(t) + n_{x,k} \qquad 0\text{-}37$$

$$a_{y,k}(t) = \text{north}(t) + n_{y,k} \qquad 0\text{-}38$$

$$h_k(t) = h(t) + n_{h,k} \qquad 0\text{-}39$$

Where $a_{x,k}(t)$ is the measured acceleration in the x direction by the kth sensing element and $n_{x,k}$ is the random noise in the x direction for the kth sensing element. Likewise $a_{y,k}(t)$ and $h_k(t)$ are the measurements in the y direction and pressure sensor respectively. The noise is random, uncorrelated white noise.

When the array comprises sensors 22 rotated relative to one another, a rotation angle $\varphi$ is used where $\varphi$ represents the rotation of the element from the counter clockwise direction. The measurement at the sensing element a(t) and h(t), can then be modified and expressed as follows:

$$a_k(t) = \cos(\theta - \phi) + n_{x,k} \qquad 0\text{-}40$$

$$h_k(t) = h(t) + n_{h,k} \qquad 0\text{-}41$$

As can be seen the acceleration no longer has explicit x and y directions. Strictly speaking, the sensing elements do not have to maintain perpendicularity, and therefore x and y have no particular meaning. The present invention can be implemented with the pairs of accelerometers or individual sensors that comprise the sensors 22 at each location 23 other than orthogonal to each other. In practice, however, it is advantageous to get the sensors 22 as x/y pairs to have perpendicular sensors rotated 90 degrees from each other.

2.6 Measurement and Signal Processing

Figure 9:
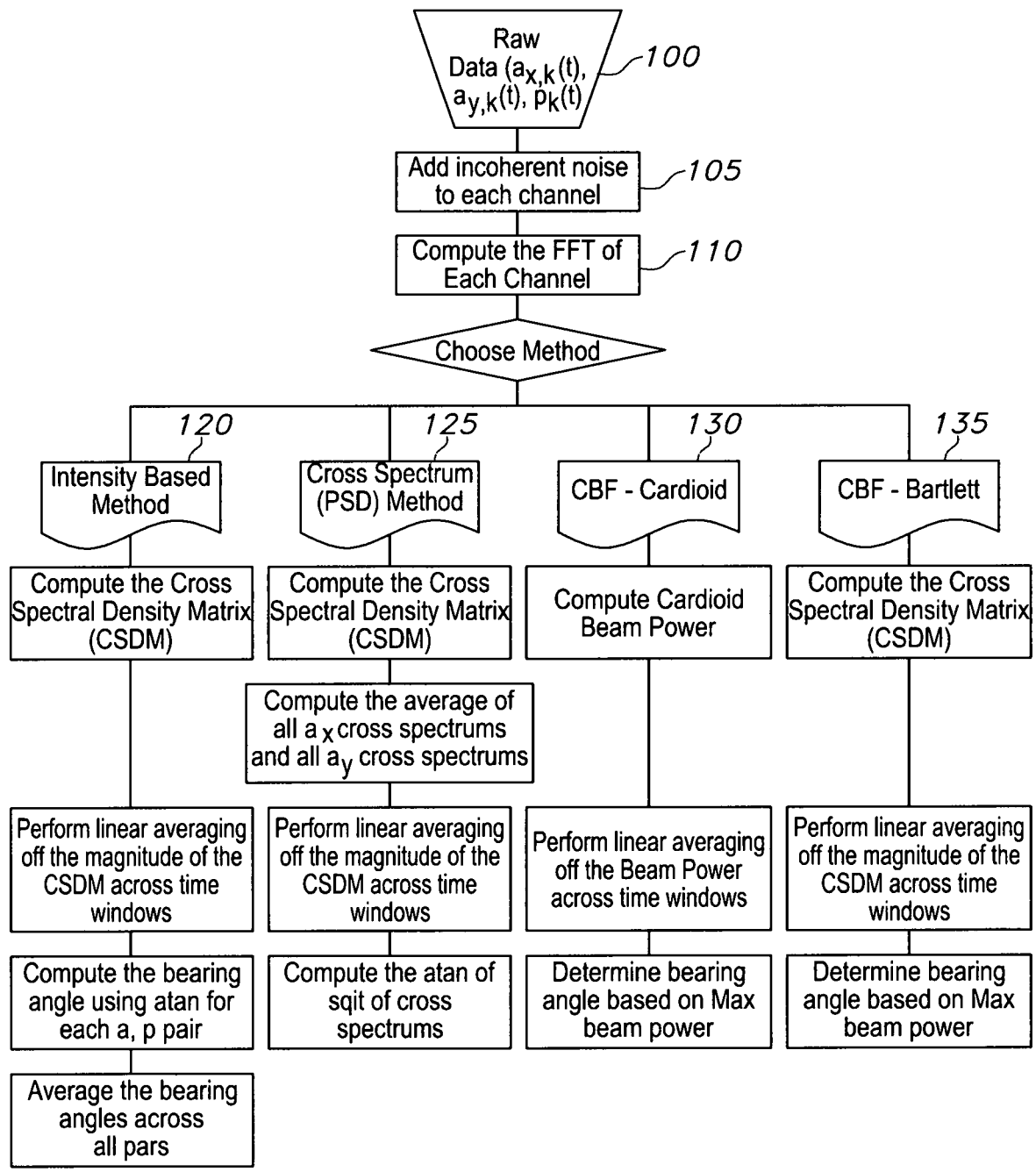
FIG. 9 is a flow chart of signal processing according to an embodiment of the invention.

FIG. 9 diagrams the signal processing techniques and computational methods for processing sensed data according to possible embodiments of the invention. In the diagram of FIG. 9 the raw sensed data, is received by the sensors 22 of array 21, in step 100. An optional noise generating circuit then adds incoherent noise to the sensed signal in step 105. The noise generating circuit can comprise any one of a number of digital or analogue circuits commonly known to those of skill in the art, or alternatively, comprise a software generated source of incoherent noise. Next, in step 110, the Fast Fourier Transform (FFT) of each signal channel is obtained.

A processor then selects one or more of the computational signal processing methods 120, 125, 130, 135 described above to resolve the sensed data into a bearing angle to (or from) the target. While just a single method can be used to process the data, simultaneously processing the data using multiple methods when sufficient memory, and computational capability exist can further reduce errors. The outputs from multiple means of computation can then be blended and filtered to improve the overall accuracy of the computed results and to detect erroneous signals, outliers, and errors.

One method of detecting outliers, is the IQR method which examines the calculated values from several previous computations. The IQR method can be used to detect outliers with any single method of computation or with the data from multiple forms of computation. Let the interquartile range IQR be defined as the middle 50% of the distribution such that:

$$IQR = Q_3 - Q_1 \qquad 0\text{-}42$$

Where, $Q_3$=median(Upper Half(Bearing Angles))      0-43

And, $Q_1$=median(lower Half(Bearing Angles))      0-44

Where Bearing Angles is the bearing angles for the last N computations. To determine if data point p is an outlier, using the last N values including p:

$Q_1-\text{IQR} \leq p \leq Q_3+\text{IQR}$      0-45

If p does not meet the requirements above, it is an outlier and is replaced by the median of the last N bearing angles.

The computational demands of each method are shown below in Table 1.

TABLE 1

Computational Requirement of Each Method

| | IB | PSD | CBF-Cardioid | CBF-Bartlett |
|---|---|---|---|---|
| # of FFTs | 1 + 2N | 2N | 1 + 2N | 1 + 2N |
| CSDM Matrix Size | 1 × 2N = 2N | $\sum_{k=0}^{2N} 2N + 2k$ | 0 | 2N × 2N = $4N^2$ |
| Beam Power Matrix | 0 | 0 | $1 \times \frac{360}{\Delta\theta}$ | $1 \times \frac{360}{\Delta\theta}$ |
| Bearing angle Computation | atan | atan | Max | Max |

Where N is the number of sensor pairs and $\Delta\theta$ is the bearing angle resolution. Each computation method requires an FFT be performed, but the difference in the number of FFTs required per computational method is negligible. The size of the CSDM matrix does vary by method, and is not required for the Cardioid method. The PSD uses only a subset of the CSDM matrix and is similar to the Intensity Method in computational load. The PSD method, however, also requires a separate check to identify the Cartesian quadrant of the acoustic signal. The CBF-Bartlett method is the most computationally expensive.

Accuracy improves the more data points available per window of analyzed time. For a fixed amount of time, a longer window with less averaging improves the accuracy of results.

2.7 Other Measurements

The range to target may be computed using any number of other techniques known to those of skill in the art and documented, for example, in Liu et al supra. For example, when acoustic vector sensor 22 includes a calibrated pressure sensor, the distance from the target can be roughly estimated. Optionally vector calculus can be used to estimate the range from the various measurements by sensors 22 in array 21 using triangulation, The velocity of the target may also be computed using any number of techniques known to those of skill in the art. In the present invention, for example, the rate of change in bearing can be used in conjunction with the range estimate to compute the velocity.

3.0 System Architecture

Figure 10B:
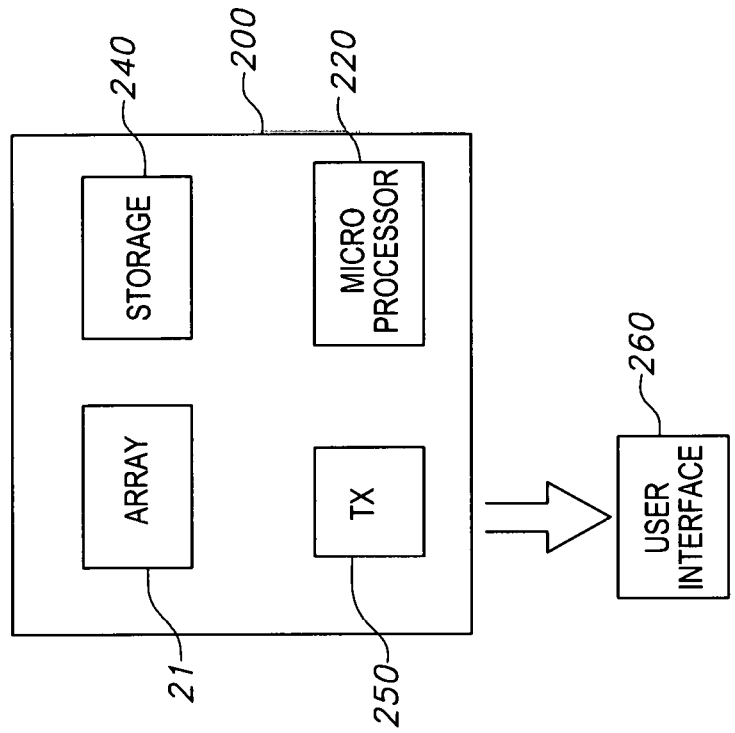
FIGS. 10A and 10B diagram possible embodiments of an acoustic vector sensing system according to the invention.
Figure 10A:
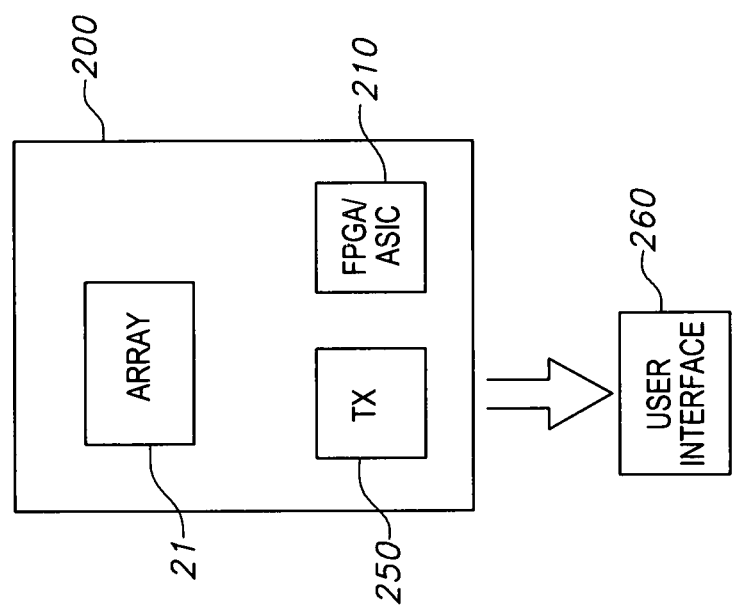

FIGS. 10A and 10B contain block diagrams of possible embodiments of an acoustic vector system according to an embodiment of the invention. In the embodiment of FIG. 10A, the signal processing and computations may be conducted by an ASIC chip or logic circuit 210 collocated on the circuit board 200 with sensors 22, or otherwise collocated within the acoustic vector sensor or hydrophone 40 circuitry. The computations may be performed in the digital logic of the ASIC or, as shown in FIG. 10B, via a microprocessor 220 and software code stored in memory 240 on circuit board 200, or a separate circuit board located within acoustic vector sensor or hydrophone 40. The completed computations can then be transmitted to the end user from acoustic vector sensor or hydrophone 40 using an acoustic modem, wireless communication, hardwired cable or other transmitter 250 known to those of ordinary skill in the art. A user interface 260 receives the transmitted raw or processed data and displays results on the user interface. Optionally, the raw sensor data can be transmitted to a remote location such as a support vessel, oil rig, aircraft, or shore location, where the raw sensor data can be processed.

4.0 Advantages

Figure 11:
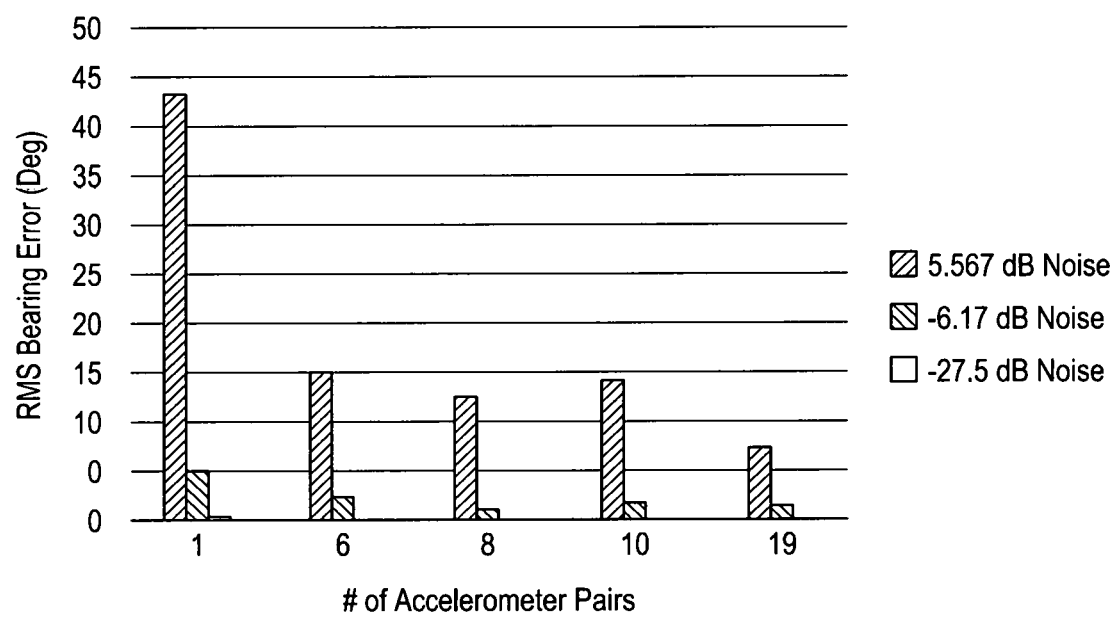
FIG. 11 is a chart illustrating performance advantages of the invention over the prior art.

FIG. 11 illustrates the reduction in bearing angle error achieved using the embodiment of the invention depicted in FIG. 3A. As seen in FIG. 11, when an sensors 22 comprise an array 21 numbering at least 19 pairs of accelerometers, the acoustic vector sensor of the present invention achieves at least a 5×improvement in the bearing angle measurement to the target over prior art hydrophones housing a single sensor. Over multiple simulated test measurements, the average bearing angle error of this sensor configuration was never more than five degrees. In contrast, the single sensor of prior art designs, incurred errors as much as twenty eight degrees. Clearly, large arrays of individual hydrophones are necessary to triangulate the source of sound in prior art designs to achieve a reasonable amount of accuracy. Even with smaller numbers of sensors 22 within the array 21, the present invention still outperforms prior art devices. As also shown in FIG. 11, acoustic vector sensors constructed according to the teachings of the present invention comprising six, eight, or ten pairs of sensors 22 within the array 21, all achieve significant error reductions over prior art devices.

What is claimed is:

1. A method for finding a bearing to a target by sensing pressure waves, comprising the steps of:
   positioning an array of co-located sensors, wherein a plurality of elements in the array include at least two sensors;
   sensing at the array of co-located sensors a pressure wave associated with the target;
   outputting to a signal processor, a signal from the sensors in response to the pressure wave; and,
   processing the signal and outputting a value indicative of at least one of a bearing, velocity, and range to the target.

2. The method of claim 1, wherein the step of processing the signal further includes the step of performing intensity based method calculations.

3. The method of claim 1, wherein the step of processing the signal further includes the step of performing cross spectrum method calculations.

4. The method of claim 1, wherein the step of processing the signal further includes the step of performing CBF Cardiod calculations.

5. The method of claim 1, wherein the step of processing the signal further includes the step of performing CBF Bartlett calculations.

6. The method of claim 1, wherein the step of processing the signal further includes the step of adding incoherent noise.

7. The method of claim 1, wherein the step of processing the signal further includes the step of computing a Fast Fourier Transform.

8. The method of claim 1, further comprising the step of:
   calibrating the array of co-located sensors using a target with known characteristics.

9. The method of claim 1, wherein the step of processing the signal further includes the step of calculating a velocity of the target.

\* \* \* \* \*